United States Patent [19]
Gordon et al.

[11] Patent Number: 5,155,620
[45] Date of Patent: Oct. 13, 1992

[54] NONLINEAR OPTICAL DEVICES AND METHODS

[75] Inventors: Heidi M. Gordon, Willingboro, N.J.; William R Holland, Ambler, Pa.; Hung C. Ling, Belle Mead; Gary L. Wolk, West Trenton, both of N.J.

[73] Assignee: AT&T Bell Laboratories, Murray Hill, N.J.

[21] Appl. No.: 717,566

[22] Filed: Jun. 19, 1991

[51] Int. Cl.$^5$ .............................................. H30F 7/00
[52] U.S. Cl. ..................................... 359/328; 372/21; 372/29; 372/20; 385/2; 385/141
[58] Field of Search ....................... 372/20, 29, 21, 22; 359/328; 385/2, 141

[56] References Cited

U.S. PATENT DOCUMENTS

| | | | |
|---|---|---|---|
| 4,070,094 | 1/1978 | Martin | 350/96 |
| 4,607,909 | 8/1986 | Sanford | 350/96.14 |
| 4,799,749 | 1/1989 | Borner et al. | 350/96.13 |
| 4,859,876 | 8/1989 | Dirk et al. | 359/328 |
| 4,900,127 | 2/1990 | Robello et al. | 385/141 |
| 4,932,737 | 6/1990 | Yoon et al. | 385/3 |
| 4,932,738 | 6/1990 | Haas et al. | 385/2 |
| 4,936,645 | 6/1990 | Yoon et al. | 385/2 |
| 4,946,262 | 8/1990 | Diemeer | 350/362 |
| 5,008,043 | 4/1991 | Robello et al. | 385/141 |
| 5,039,186 | 8/1991 | Man et al. | 385/141 |
| 5,045,364 | 9/1991 | Fang | 372/20 |

OTHER PUBLICATIONS

"Poled electro-optic waveguide formation in thin-film organic media," J. I. Thackara et al., *Applied Physics Letters*, vol. 52, No. 13, Mar. 28, 1988, pp. 1031-1033.

"Optical Waveguides Fabricated by Preferential Etching," W. Tsang et el., *Applied Optics*, vol. 14, No. 5, May 1975, pp. 1200-1206.

"Embossed Optical Waveguides," R. Ulrich et al., *Applied Physics Letters*, vol. 20, No. 6, Mar. 15, 1972, pp. 213-215.

*Primary Examiner*—Léon Scott, Jr.
*Attorney, Agent, or Firm*—Anderson, R. B.

[57] ABSTRACT

An optical waveguide circuit including a nonlinear optical device comprises a metal ground plane (21), a polymer core layer (25) in which optical waves are propagated, and polymer clad layers (22 and 26) on opposite sides of the core layer. The waveguide paths are defined by troughs (23) in one of the clad layers. The nonlinear device is made by electrooptically poling part of the core layer which contains a nonlinear moiety. The clad layers (26 and 22) have a significantly higher conductivity than that of the core layer (25) which improves the efficiency of the electrooptic poling.

16 Claims, 2 Drawing Sheets

NONLINEAR OPTICAL DEVICES AND METHODS

TECHNICAL FIELD

This invention relates to nonlinear optical devices such as electrooptic modulators and switches, frequency converters, data processors, optical parametric oscillators and amplifiers, and methods for making such devices.

BACKGROUND OF THE INVENTION

Optical transmission systems have come into widespread use primarily because of the ability of optical fibers to transmit at low cost much greater quantities of information than other comparable transmission media. Processing of such information normally requires that the information first be converted to an electronic form. It has long been realized that the costly and inefficient conversion to electronic form could be avoided by using optically nonlinear devices to perform such functions as modulation, switching, mixing, data processing and the like directly on the lightwaves. Lithium niobate is the most commonly used optical nonlinear medium, although certain organic crystalline materials have also been proposed. To date, such devices have not proved sufficiently manufacturable, reliable and efficient to displace electronic devices for most of the operations mentioned above.

The patent of Dirk et al., U.S. Pat. No. 4,859,876, granted Aug. 22, 1989, hereby incorporated herein by reference, describes a nonlinear optical element comprising a glassy polymer containing an optically nonlinear organic moiety. The nonlinearity results from electric poling during fabrication which permanently aligns dipoles within the polymer. The glassy polymer may be polymethylmethacrylate (PMMA), although other acrylate based polymers were also mentioned. The Dirk et al. patent represents a significant advance of the stage of the art since polymers such as PMMA can be applied as a thin film to substrate and their properties controlled much more easily and accurately than crystalline substances. The PMMA films constituting the hear of the various disclosed electrooptic devices may range from only about one micron to about two hundred microns in thickness.

One problem with the nonlinear optical devices proposed by Dirk et al. is that they are somewhat difficult to fabricate. It is difficult to pattern the PMMA films to define precisely the lightwave propagation paths and to electrically pole the nonlinear regions with efficiency. It is particularly difficult to define paths for single-mode propagation of light as is required for most efficient operation of optically nonlinear devices.

Accordingly, there is a long-felt need for ways to improve the manufacturability and efficiency of nonlinear optical devices.

SUMMARY OF THE INVENTION

In accordance with the invention, an optical waveguide circuit including a nonlinear optical device is made by, first, forming a first polymer optical clad layer over a metal ground plane. The optical waveguide paths of the circuit are then defined by reactive ion etching of troughs in the upper surface of the first clad layer. Over the clad layer a core layer is formed, and over the core layer a second polymer clad layer is formed. On the upper surface of the second clad layer an electrode is formed by photolithographic masking and etching to define the portion of the optical path which is to constitute the nonlinear device.

The core layer contains a nonlinear dye moiety, and the portion of the waveguide layer beneath the electrode is electrically poled by applying an electric field to the core layer which has been softened by heating. The poling voltage aligns certain dye molecules in the polymer in accordance with the principles of the Dirk et al. patent, and after cooling this region of the waveguide layer permanently displays a net second order optical susceptibility, as required for operation as a nonlinear device. In accordance with the invention, the two clad layers have an electrical resistivity at the poling temperature which is significantly lower than that of the waveguide layer. This has the effect of concentrating the electric field in the waveguide layer during the poling process to increase the efficiency with which the waveguide layer can be poled.

After construction, the apparatus consists of overlapping polymer layers, with the waveguide paths being defined by the troughs in the first clad layer, and the nonlinear device region being defined by the electrode that was used for poling the waveguide layer. During operation, that same electrode is used for controlling the nonlinear device within the waveguide path. The troughs are made to define single-mode lightwave paths, which increases the efficiency of operation of the nonlinear device.

As will be appreciated more fully from the discussion to follow, the invention makes it quite easy to form an optical "printed circuit," a portion of which constitutes an efficient optically nonlinear device. The reactively ion etched troughs in the first clad layer can be made to define optical paths capable of propagating light in a single mode, as opposed to multimode light propagation, as is preferable for use with an optically nonlinear device. These and other objects, features and advantages of the invention will be better understood from a consideration of the following detailed description taken in conjunction with the accompanying drawing.

DETAILED DESCRIPTION

Figure 1:
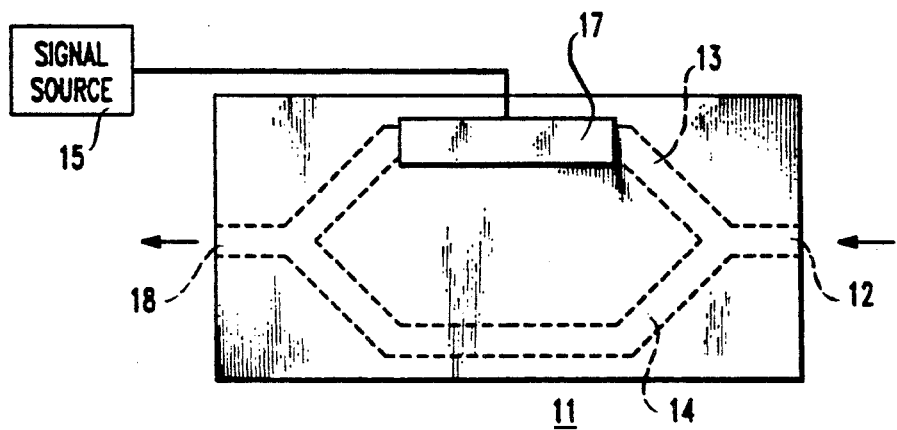
FIG. 1 is a schematic top view of an optical modulator made in accordance with an illustrative embodiment of the invention.

It should be noted that the drawings are schematic and not to scale and in fact have been distorted to reveal more clearly certain important features of the invention. Referring now to FIG. 1, there is shown schematically an optical modulator device 11 of a type described in detail in the aforementioned Dirk et al. patent. Incident light on a waveguide 12 is evenly divided to propagate onto waveguide branches 13 and 14 of equal length.

The arrows pointing to and from the device 11 schematically indicate known means for respectively applying lightwaves to, and deriving lightwaves from, the device. A voltage control signal applied from a source 15 to an electrode 17 changes the index of refraction of the waveguide branch 13 beneath electrode 17 due to the presence of a nonlinear optical medium in the branch 13. The change in refractive index results in an effective change of the optical path length in branch 13, which in turn produces either constructive or destructive interference of the light in a waveguide portion 18 in which light from the two branches 13 and 14 is recombined. As the voltage is changed to give different interference conditions, the output intensity changes such that the output intensity of light from the waveguide region 18 is modulated as a function of the control signal.

Figure 2:
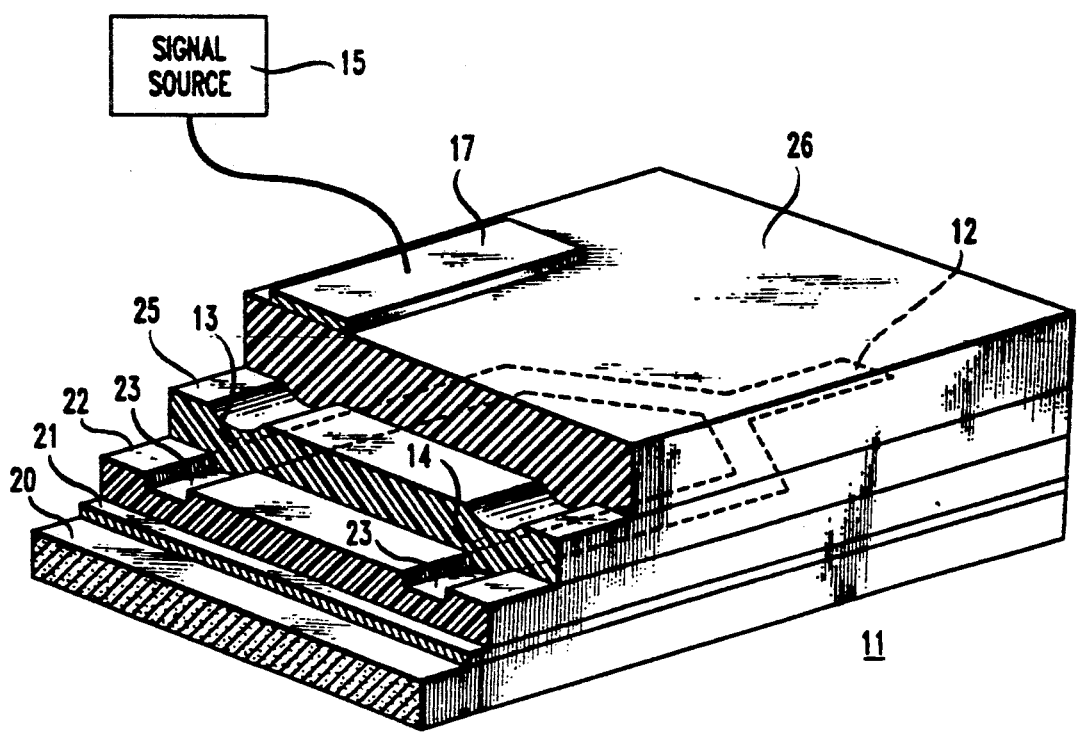
FIG. 2 is a partially sectioned perspective view of the device of FIG. 1.

Referring to FIG. 2, the device 11 comprises a substrate 20 over which is formed a metal ground plane 21. Over the ground plane is deposited a first polymer clad layer 22. The upper surface of the clad layer 22 includes troughs 23 which define the waveguide paths 12, 13, and 14. Over the clad layer 22 is deposited a polymer core layer 25 and over the core layer is a second polymer clad layer 26. Clad layers 22 and 26 have a lower refractive index than the core layer 25, which confines the propagating light beam to the optically transparent core layer 25; that is, it confines the beam within the vertically displaced boundaries. The troughs 23 serve to confine the light within the horizontal boundaries of the troughs and also serve to cause the light to propagate as a single mode, as will be discussed below. The terms "core" and "clad" are used because of their respective functional analogy to an optical fiber core and the clad layer of an optical fiber.

An important advantage of the apparatus of FIG. 2 is its ease of manufacture. All of the layers are made of a polymer material which can be coated by various known means such as spinning. All of the polymer layers are continuous; that is, none of the layers needs to be patterned for the purpose of defining the waveguide paths 12, 13, and 14. Rather, these paths are defined by etching the troughs 23.

Figure 3:
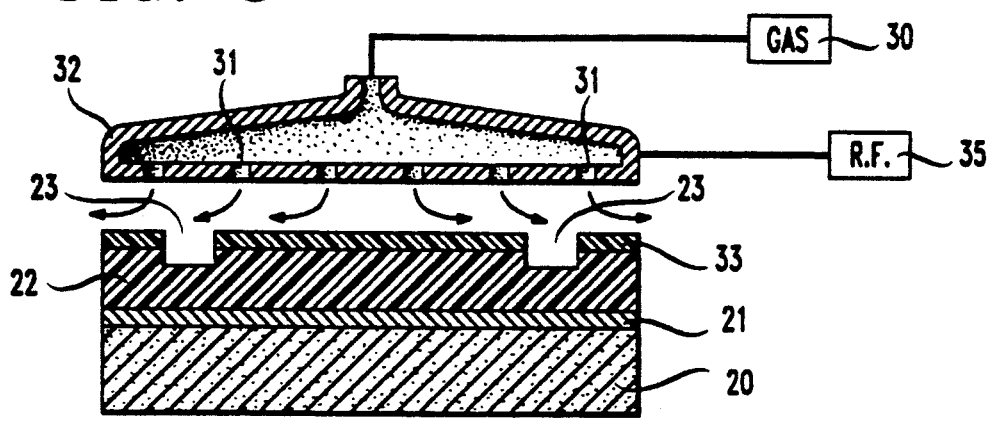
FIG. 3 is a schematic view of reactive ion etching apparatus that may be used in making the device of FIG. 1.

Referring to FIG. 3, the troughs 23 are preferably made by reactive ion etching. As is know, reactive ion etching involves the use of a gas etchant that has been ionized to form a plasma which enhances a reaction that etches a substrate. Thus, a reactive gas from a source 30 is projected as shown by the arrows through apertures 31 within a radio frequency (rf) electrode 32 to be proximate the polymer clad layer 22 to be etched. A masking layer 33, within which apertures have been made by photolithographic masking and etching, defines openings within which the troughs 23 are to be etched. The gas is ionized by rf energy from a source 35 to promote the etch reaction.

Troughs 23 must be made with great accuracy so that their dimensions are within prescribed limits related to the frequency of the optical energy to be transmitted by the waveguides. For example, to propagate light having a wavelength of 1.0 microns, the troughs 23 should be made to have a depth of 0.5 microns and a width of four microns, together with a core layer thickness of 2.0 microns to ensure propagation in a single mode. A width of grater than eight microns or a depth greater than one micron could result in undesirable multimode propagation of light of such wavelength. It is known in the art to define multimode waveguide paths by troughs or indentations in a clad layer as described above, but to the best of our knowledge, no one has heretofore succeeded in making single-mode waveguides by defining troughs in a polymer surface in this manner. We have succeeded in making single-mode waveguides because of the accuracy with which certain polymers can be etched by reactive ion etching. As is know, single-mode propagation is required for most efficient operation of the nonlinear optical device.

In one embodiment that was made, the clad layer 22 was made of UV-15, an acrylate commercially available from Master Bond, Inc., of Hackensack, N.J., having a thickness of four microns. The masking layer 33 was Shipley 1805 photoresist, commercially available from the Shipley Corporation of Newton, Mass., spun onto a thickness of two microns. The reactive ion etch machine was a model PLB80, commercially available from Plasma Technology of Avon, England. The gases were $CHF_3$ flowing at 4.9 cubic centimeters per minute and $O_2$ flowing at 5.0 cubic centimeters per minute. The rf power was three hundred watts and the total pressure was one torr. Under these conditions, the etch rate was seven hundred angstroms per minute and the trough 23 was etched to a depth of 0.5 microns. The photoresist thickness can be chosen such as to etch away completely clearing the trough etc, thereby obviating the need for a separate photoresist removal step.

Figure 4:
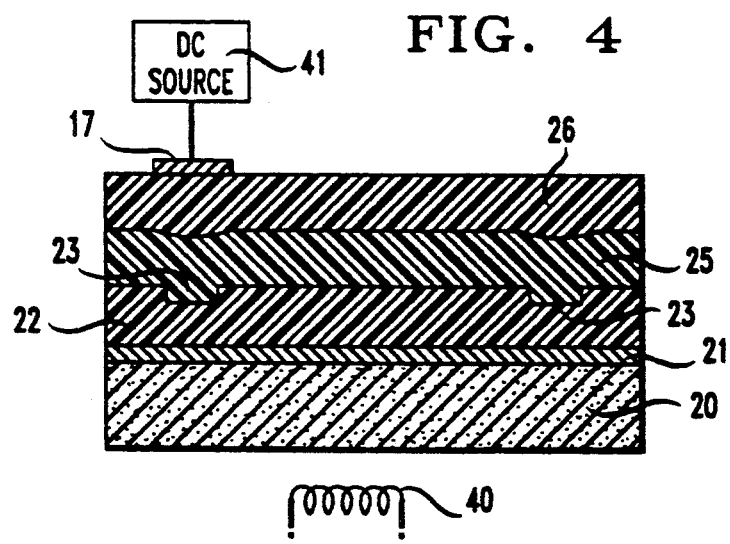
FIG. 4 is a sectional view of the device of FIG. 1, including a heater used during an electrooptic poling process.

Referring to FIG. 4, after formation of the troughs 23, the core layer 25 was deposited. The core layer 25 may be any of various polymers containing a moiety that can be poled to be optically nonlinear. For example, it may be polymethylmethacrylate (PMMA) containing disperse red one dye (DR1) which is an azo dye, specifically 4-[ethyl(2-hydroxyethyl)amino]-4'-nitroazobenzene. The dye moiety may also be 4-amino-4'-dicyanovinylazonenzene (DCV). The polymer in solution or in its uncured state is spun to a thickness of typically two microns and then cured or hardened. Thereafter, a second clad layer 26 is deposited, again by spinning, to a thickness of approximately four microns. After hardening, the electrode 17 is formed by, for example, evaporation of aluminum, which is then defined by photolithographic masking and etching. The clad layer 26 may be UV-15, which we have found makes a good bond to aluminum provided that, prior to deposition of the aluminum, the upper surface is roughened by plasma etching. That is, the upper surface of clad layer 26 is etched by the apparatus of FIG. 3 for a fraction of a micron to roughen it.

After completion of the structure of FIG. 4, the entire structure is heated by apparatus shown schematically at 40 for the purpose of heating core layer 25 to a temperature above its glass transition temperature $T_g$, that is, the temperature at which the polymer core layer 25 begins to flow. This heating permits the dye molecules to be poled, and electrooptic poling is accomplished by applying a dc voltage from a source 41 to the electrode 17. The voltage required for effective poling varies with the material, but an electric field within core layer 25 of approximately $1 \times 10^6$ volts per centimeter is typically required.

Figure 5:
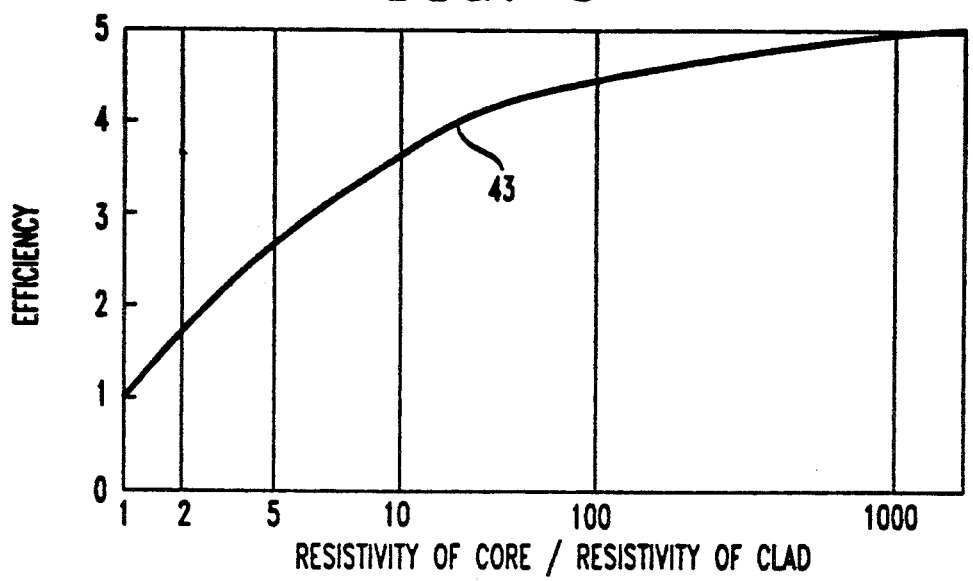
FIG. 5 is a graph of electrooptic poling efficiency as a function of the core to clad bulk resistivity ratio, which is relevant to the fabrication of a nonlinear device such as the device of FIG. 1.

In accordance with a feature of the invention, the efficiency of poling is enhanced by using, as clad layers 22 and 26, materials that have an electrical resistivity that is much lower than that of the core layer 25 at the poling temperature. Referring to FIG. 5, curve 43 is a graph showing the efficiency of poling as a function of the ratio of electrical resistivity of the core layer 25 to that of the clad layers 22 and 26 with the layer thicknesses given above. One can see that the efficiency is significantly greater if the resistivity of the core is approximately twice that of the clad layer and this dramatic increase continues until the ratio is one hundred, after which the curve 43 tends to level off. Advantageously, UV-15 has a resistivity about one hundredth that of PMMA containing either of the dye molecules mentioned above. Thus, the poling efficiency is much higher than it would be if the resistivity of the clad layers were equal to that of the core layer 25. It is common in the prior ar to use glass as a clad layer which would reduce the efficiency to a factor of less than one, since glass has a higher resistivity than that of PMMA. Since conductivity is inversely proportional to resistivity, the conductivity of the UV-15 clad layers is about one hundred times greater than the conductivity of the PMMA core layer.

From the foregoing, it can be appreciated that the invention makes it quite easy to mass produce optical circuits, a portion of each of which constitutes a highly efficient optically nonlinear device. Reactive ion etching can be used to form troughs in the first clad layer capable of propagating light in a single mode as is desired for efficient use of the nonlinear optical device. The various layers are produced by spinning or other straightforward coating process, and patterning of the layers to form the optical circuits is not required. The high conductivity of the clad layers makes it possible to produce efficiently a nonlinear device with an electrode that is retained as part of the device after fabrication.

Materials other than polymers could conceivable be used as the clad layers, but the use of polymers as has been described gives significant advantages of ease of fabrication and efficient poling of the nonlinear devices. While a modulator was described in detail, the invention could clearly be used for making switches, frequency converters, data processors, and optical parametric oscillators and amplifiers and other such devices for operating directly on propagating lightwaves, as is known in the art. Various other modifications and embodiments may be made by those skilled in the art without departing from the spirit and scope of the invention.

We claim:

1. An optical device comprising:
   a polymeric optically nonlinear member;
   first and second polymer clad members on opposite sides of the nonlinear member;
   means comprising the nonlinear member and the clad members for propagating light along a path in a first direction;
   means for operating on said light comprising means for applying an electric field across the nonlinear member in a direction substantially transverse to the first direction;
   the first and second clad layers having an electrical conductivity at least two times greater than the electrical conductivity of the nonlinear member.

2. The device of claim 1 wherein:
   the nonlinear member is part of a third polymeric layer sandwiched between the first and second layers, the major portion of the second layer not being nonlinear.

3. The device of claim 2 wherein:
   the first, second and third layers are supported by a substrate;
   the first, second and third layers each substantially completely cover the surface area of the substrate; and the first polymeric layer contains at least one trough in an upper surface thereof, said trough defining the path for light propagation.

4. The device of claim 3 wherein:
   the first and second clad layers have a lower index of refraction than the third layer, thereby to confine the light propagated to the third layer.

5. The device of claim 4 wherein:
   the electric field applying means comprises a metal electrode formed on the second clad layer and overlying part of said light propagating path.

6. The device of claim 5 wherein:
   the third polymer layer comprises a dye moiety;
   the nonlinear member is made by softening the third polymer layer and applying a poling voltage to align dye molecules in the third polymer layer;
   and the said metal electrode comprises means for applying said poling voltage.

7. The device of claim 1 wherein:
   the electrical conductivities of the first and second clad layers are at least one hundred times greater than the electrical conductivity of the nonlinear member.

8. A method for making an optical device comprising the steps of:
   forming a first polymer clad layer having a relatively low resistivity on a metal ground plane;
   etching at least one trough in an upper surface of the first clad layer to define an optical path;
   forming a substantially continuous polymer core layer over the first clad layer, the core layer having a relatively high resistivity and containing dye molecules;
   forming over the core layer a second polymer clad layer having a relatively low resistivity;
   forming on an upper surface of the second clad layer a metal electrode which overlies said trough;
   and electrooptically poling a portion of the core layer comprising the step of applying a voltage to the electrode.

9. The method of claim 8 wherein:
   said trough is made by reactive ion etching.

10. The method of claim 8 wherein:
    the metal electrode is made by, first, subjecting the upper surface of the second clad layer to a reactive ion etch, next, applying a continuous metal layer on the upper surface of the second clad layer, and then photolithographically defining the metal electrode.

11. The method of claim 8 wherein:
    the first and second clad layers have a lower index of refraction than the core layer, whereby propagating light is confined to the core layer;
    and the thickness of the core layer and the dimensions of the trough are made sufficiently small to support single-mode propagation of light in the core layer.

12. The method of claim 8 wherein:
    the resistivity of the core layer is at least two times greater than that of either clad layer.

13. The method of claim 8 wherein:
    the resistivity of the core layer is at least one hundred times greater than that of either clad layer.

14. An optical circuit device comprising:
    a substantially continuous polymer core layer sandwiched between first and second polymer clad layers;
    a ground plane conductor on one surface of the first clad layer;

a plurality of optical paths defined in the core layer by a plurality of troughs formed in the interface of the core layer with the first clad layer;

the first and second clad layers having a lower index of refraction than the core layer;

a signal electrode located on a surface of the second clad layer overlying part of one of said optical paths;

the core layer portion beneath the signal electrode being electrooptically poled to have a second order optical susceptibility therein;

and the electrical resistivity of the core layer is significantly higher than the electrical resistivity of either the clad layers, thereby to increase poling efficiency.

15. The device of claim 11 wherein:

two troughs in the first clad layer define parallel optical paths extending from an input region of the device to an output region;

the signal electrode overlies one branch but not the other branch;

and further comprising means for applying lightwaves to the input region and deriving lightwaves from the output region.

16. The device of claim 14 wherein:

the resistivity of the core layer is at least one hundred times greater than the resistivity of either of the clad layers.

* * * * *